United States Patent
Toliver (10) Patent No.: US 8,497,467 B2
(45) Date of Patent: Jul. 30, 2013

(54) OPTICAL FILTER CONTROL

(75) Inventor: Paul Toliver, Tinton Falls, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 710 days.

(21) Appl. No.: 12/639,331

(22) Filed: Dec. 16, 2009

(65) Prior Publication Data

US 2010/0327147 A1 Dec. 30, 2010

Related U.S. Application Data

(60) Provisional application No. 61/168,770, filed on Apr. 13, 2009.

(51) Int. Cl.
*G01J 3/50* (2006.01)
*G01J 1/04* (2006.01)
*G02F 1/295* (2006.01)

(52) U.S. Cl.
USPC .......................... 250/226; 250/227.12; 385/5

(58) Field of Classification Search
USPC ............ 250/227.12, 227.19, 550, 206, 201.1, 250/201.9, 214 A, 214 LA, 214.1, 214 AG, 250/214 AL, 214 RC; 385/2, 3, 5, 8; 327/2–8, 327/14, 39, 40, 47, 51, 52, 65, 90; 359/238, 359/239, 245, 276, 278, 279, 316, 578
See application file for complete search history.

(56) References Cited

U.S. PATENT DOCUMENTS

| | | | |
|---|---|---|---|
| 3,881,177 A * | 4/1975 | Len et al. | 342/16 |
| 5,491,577 A * | 2/1996 | Gautheron et al. | 398/209 |
| 5,777,871 A | 7/1998 | Wise | |
| 5,825,253 A | 10/1998 | Mathe et al. | |
| 6,236,488 B1 | 5/2001 | Shimizu et al. | |
| 7,205,775 B2 * | 4/2007 | Kreit | 324/654 |
| 2004/0057534 A1 | 3/2004 | Masenten et al. | |
| 2009/0036077 A1 * | 2/2009 | Woodward et al. | 455/205 |

OTHER PUBLICATIONS

Patent Cooperation Treaty International Search Report, Dec. 6, 2010.
T. R. Schlipf et al., "Design and Analysis of a Control System for an Optical Delay-Line Circuit Used as Reconfigurable Gain Equalizer," Journal of Lightwave Technology, vol. 21, No. 9, pp. 1944-1952, Sep. 2003.
M. Secondini et al., "PLC Optical Equalizer for Chromatic and Polarization-Mode Dispersion Compensation Based on MSE Control," IEEE Photonics Technology Letters, vol. 16, No. 4, pp. 1173-1175, Apr. 2004.

* cited by examiner

*Primary Examiner* — Georgia Y Epps
*Assistant Examiner* — Don Williams
(74) *Attorney, Agent, or Firm* — Philip J. Feig

(57) ABSTRACT

A system and method for controlling an optical filter is provided. The system and method includes dithering a delay of an optical path within an optical filter unit cell, measuring a position of a filter zero, measuring a position of a filter pole, or measuring positions of both a filter zero and a filter pole by observing an output of the unit cell when the delay is dithered, and using the measurement as feedback for maintaining the position of the filter zero at a desired position, maintaining the position of the filter pole at a desired position, or maintaining the positions of both the filter zero and the filter pole at desired positions.

20 Claims, 9 Drawing Sheets

FIG. 5A
IIR TRANSFER FUNCTION

FIG. 5B
CONTROL RESPONSE

POLE AND ZERO SHIFT IN OPPOSITE DIRECTION

FIG. 6E

POLE AND ZERO SHIFT IN SAME DIRECTION

US 8,497,467 B2

OPTICAL FILTER CONTROL

CROSS-REFERENCE TO RELATED APPLICATION

The present application claims benefit of U.S. Provisional Application No. 61/168,770, filed Apr. 13, 2009, the disclosure of which is hereby incorporated by reference herein.

GOVERNMENT LICENSE RIGHTS

The U.S. Government has a paid-up license in this invention and the right in limited circumstances to require the patent owner to license others on reasonable terms as provided for by the terms of HR0011-08-C-0026 awarded by DARPA.

BACKGROUND OF THE INVENTION

Optical interference filters are often based upon coherent interference between light from a multiple of optical paths. Such filters are highly sensitive to changes in optical path length due to the short wavelengths corresponding to optical frequencies. That is, a small change in one of the optical paths of an optical interference filter gives rise to a large change in the phase of the signal exiting the path because the small change gives rise to a large phase difference, thereby significantly affecting the how the shifted signal interferes with a signal exiting a different path. When the paths of an optical filter are provided by multiple interfering waveguides, such as in an integrated optical filter, it is difficult to maintain filter stability in the presence of varying environmental conditions because the varying environmental conditions give rise to variations in the optical path lengths and thus give rise to significant variations in how the waveguide signals interfere. Further, the difficulty of maintaining stability in an optical filter system increases as the number of optical paths in the system increases.

SUMMARY OF THE INVENTION

In view of the difficulties associated with maintaining stability in optical filters having multiple interfering waveguides, a system and method for controlling an optical filter is provided. The system and method includes dithering a delay of an optical path within an optical filter unit cell, measuring a position of a filter zero, measuring a position of a filter pole, or measuring positions of both a filter zero and a filter pole by observing an output of the unit cell when the delay is dithered, and using the measurement as feedback for maintaining the position of the filter zero at a desired position, maintaining the position of the filter pole at a desired position, or maintaining the positions of both the filter zero and the filter pole at desired positions.

The closed-loop control provided by the system and method allows filter zero and filter pole positions to be maintained despite environmental changes which may affect optical path lengths within the filter.

BRIEF DESCRIPTIONS OF THE DRAWINGS

The following detailed description given by way of example, but not intended to limit the invention solely to the specific embodiments described, may best be understood in conjunction with the accompanying drawings wherein like reference numerals denote like elements and parts, in which.

DETAILED DESCRIPTION

Figure 1A:
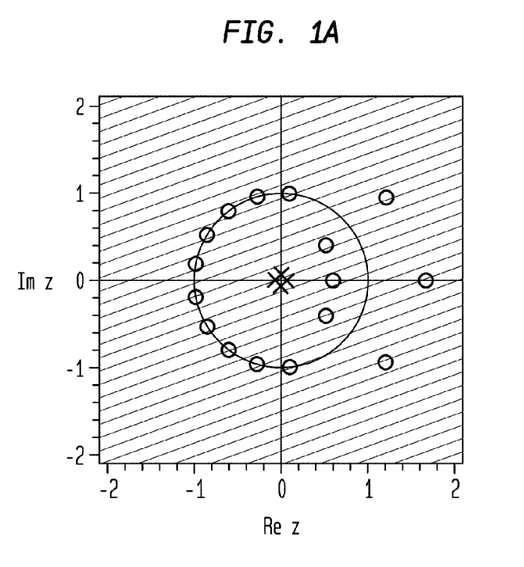
FIG. 1A is an illustrative plot of filter zeros and poles as shown on the complex Z-plane.

In one embodiment a system and method is provided for controlling the position of zeros and poles of an optical filter made up of a multiple of filter unit cells. An illustrative plot of such filter zeros and poles in the Z-plane is shown in FIG. 1A. Each zero in the plot is denoted by an "O", and each pole in the plot is denoted by an "X". The zeros and poles are plotted in the complex plane, having an abscissa that represents the real part "Re z" of the filter frequency response in the Z-domain and an ordinate "Im z" that represents the imaginary part of the filter frequency response in the Z-domain. The depiction of filter zeros and poles on a complex plane is provided to facilitate an understanding of how changes to the filter transfer function impact the filter's frequency response.

Figure 1B:
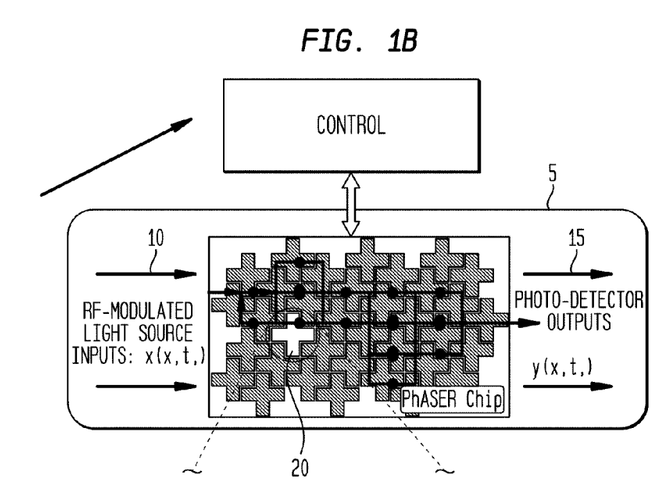
FIG. 1B is a block diagram of an optical interference filter composed of multiple individual unit cells that may be used to implement a filter having the zeros and poles shown in the plot of FIG. 1A.

FIG. 1B is a block diagram of an optical interference filter 5 that may be used to implement a filter having the zeros and poles shown in the plot of FIG. 1A. As can be seen from the figure, the optical filter has one or more light source inputs 10

("x" representing position, and "t" representing time) and one or more photo-detector outputs 15, and is made up of a multiple of unit cells such as unit cell 20.

Each of the unit cells may be used to impart one of the following to the overall filter transfer function: a zero, a pole, and a zero and a pole. Thus, the unit cell 20 may be used to contribute a zero, a pole, or a zero and a pole to the transfer function of optical filter 5. Accordingly, the multiple of unit cells making up optical filter 5 may be used to realize a filter transfer function having multiple zeros and/or multiple poles.

Figure 1C:
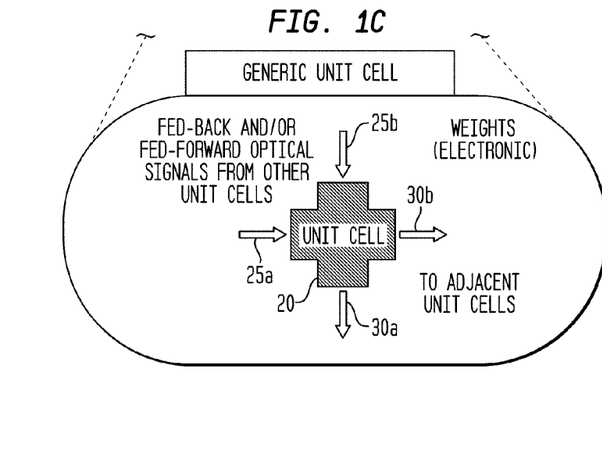
FIG. 1C is a representation of a unit cell of the optical interference filter of FIG. 1B.

The unit cell 20 of FIG. 1B is shown in more detail in FIG. 1C. The unit cell has two optical inputs 25a and 25b and two optical outputs 30a and 30b. Each of the inputs can accept one or more optical signals from other unit cells, and each of the outputs can provide an optical signal to one or more other unit cells.

Figure 2:
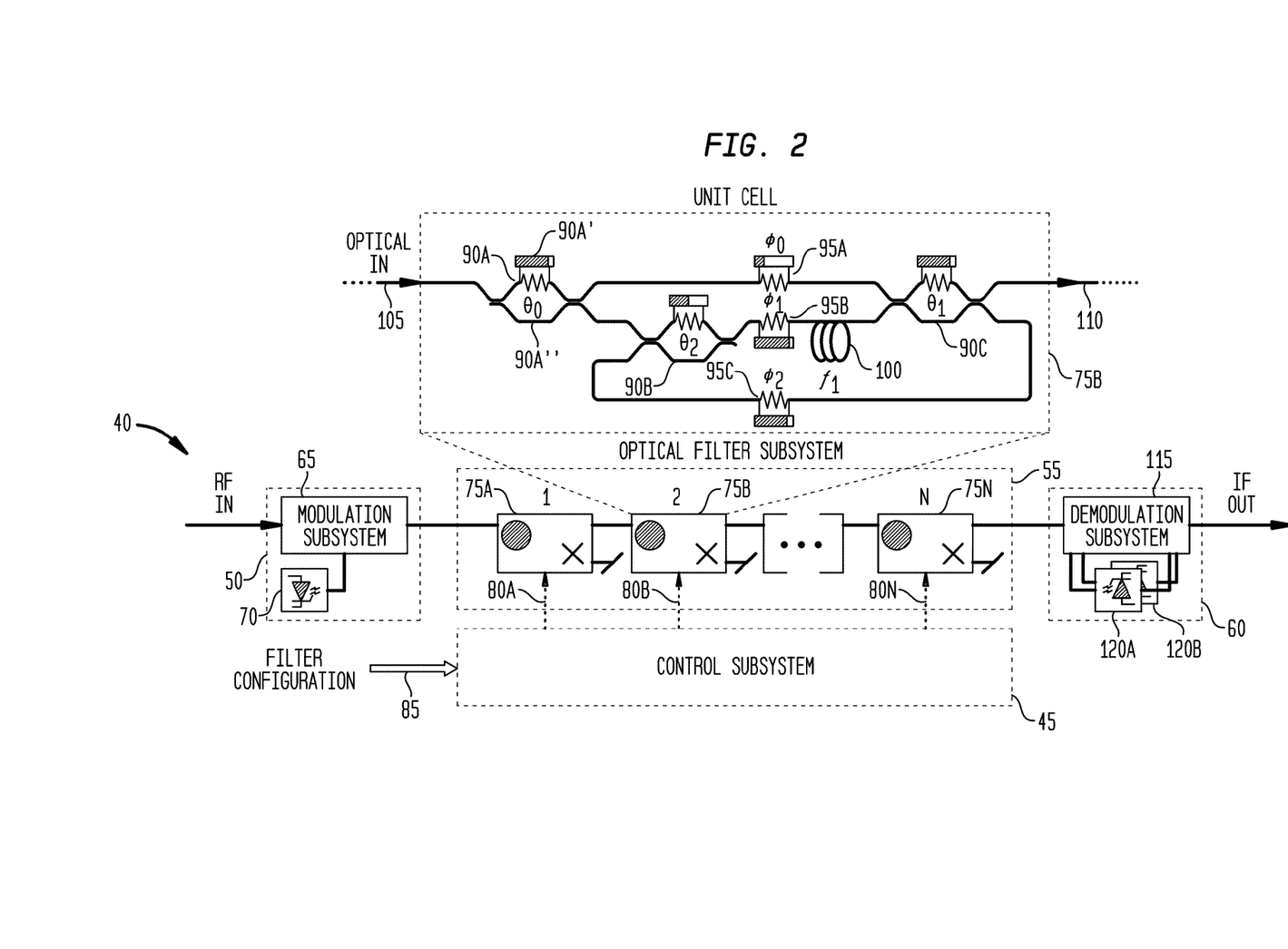
FIG. 2 is a block diagram depicting an optical interference filter composed of multiple individual unit cells and associated control system in accordance with an embodiment.

Referring now to FIG. 2, there is shown a block diagram depicting an optical interference filter placed within a Radio Frequency (RF) photonic link 40 and associated control system 45 in accordance with an embodiment. The optical-filter RF photonic link 40 is made up of an RF input section 50, an optical filter subsystem 55, and an IF output section 60. The RF input section includes a modulation subsystem 65 and an optical carrier signal generator 70. The modulation subsystem receives an RF input signal and uses the RF signal to modulate an optical carrier signal supplied from generator 70. The output of the modulation subsystem is a modulated optical signal. The modulated optical signal is passed to the optical filter subsystem.

The optical filter subsystem includes a multiple of unit cells 75A, 75B . . . 75N. The unit cells are coupled together in series, with unit cell 75A receiving the modulated optical signal from the RF input section and unit cell 75N providing input to the IF output section. Each of the unit cells contributes one of a zero, a pole, or a zero and a pole to the transfer function of the optical filter subsystem. The unit cells are respectively controlled through control signals 80A, 80B . . . 80N provided by control subsystem 45. For each unit cell, the corresponding control signal sets the position of zero and/or pole associated with the cell. The control signals are, in turn, set by the control subsystem in response to one or more filter configuration signals 85.

One possible embodiment of the unit cells of FIG. 2 is shown by way of reference to unit cell 75B. The other unit cells may have the same structure as that shown in reference to unit cell 75B, or may have different structures. Moreover, unit cell 75B may have a different structure than that shown in FIG. 2. Indeed, after reviewing this disclosure one skilled in the art will readily discern alternative unit cell structures.

As can be seen from FIG. 2, a schematic diagram of an embodiment of unit cell 75B is shown. The cell includes tunable directional couplers 90A, 90B, and 90C, tunable phase shifters 95A, 95B, and 95C, and optical delay 100. Further, each tunable optical coupler includes a phase shifter in a feed-forward path of directional coupler 90A, such as phase shifter 90A' and a second feed-forward path 90A" of directional coupler 90A. Through control of one or more of the phase shifters, the zero and/or pole position(s) of the unit cell can be controlled. In one embodiment, the optical shift applied by phase shifters 95A, 95B, and 95C is controlled for purposes of positioning the relative phase angle of the zero and/or pole associated with the unit cell.

There are many forms of phase shifters that are suitable for use in the unit cells. In one embodiment, the phase shifters take the form of thermo-optic phase shifters. Such phase shifters include a resistance heater thermally coupled to a high index core of a silica waveguide. Heat changes the temperature of the core and thereby the refractive index since it is temperature dependent. This changes the integrated product of index and distance (optical path length) and hence changes the time required for the passage of the light.

In any event, each unit cell is supplied with an optical input signal 105 and supplies an optical output signal 110. The input signal is modified according to the transfer function of the unit cell and the modified signal appears as the output. Each unit cell of the optical filter subsystem contributes to the overall transfer function of the subsystem such that the transfer function of the subsystem is equal to the multiplied transfer functions of the unit cells. The output of the subsystem is coupled to the IF output system 60.

The IF output system includes a demodulation subsystem 115 and one or more photodetectors, e.g. photodetectors 120A and 120B. The use of two or more photodetectors can provide improved performance depending upon the type of noise present in the system. The demodulation subsystem provides a mechanism for performing an optical-domain recovery of a desired signal from the output of the optical filter subsystem. The recovered signal is then passed to photodetectors 120A and 12B for conversion to the electrical domain. The output of the demodulation subsystem is an Intermediate Frequency (IF) signal representative of the RF signal input to the modulation subsystem as modified by the optical filter subsystem.

Figure 3A:
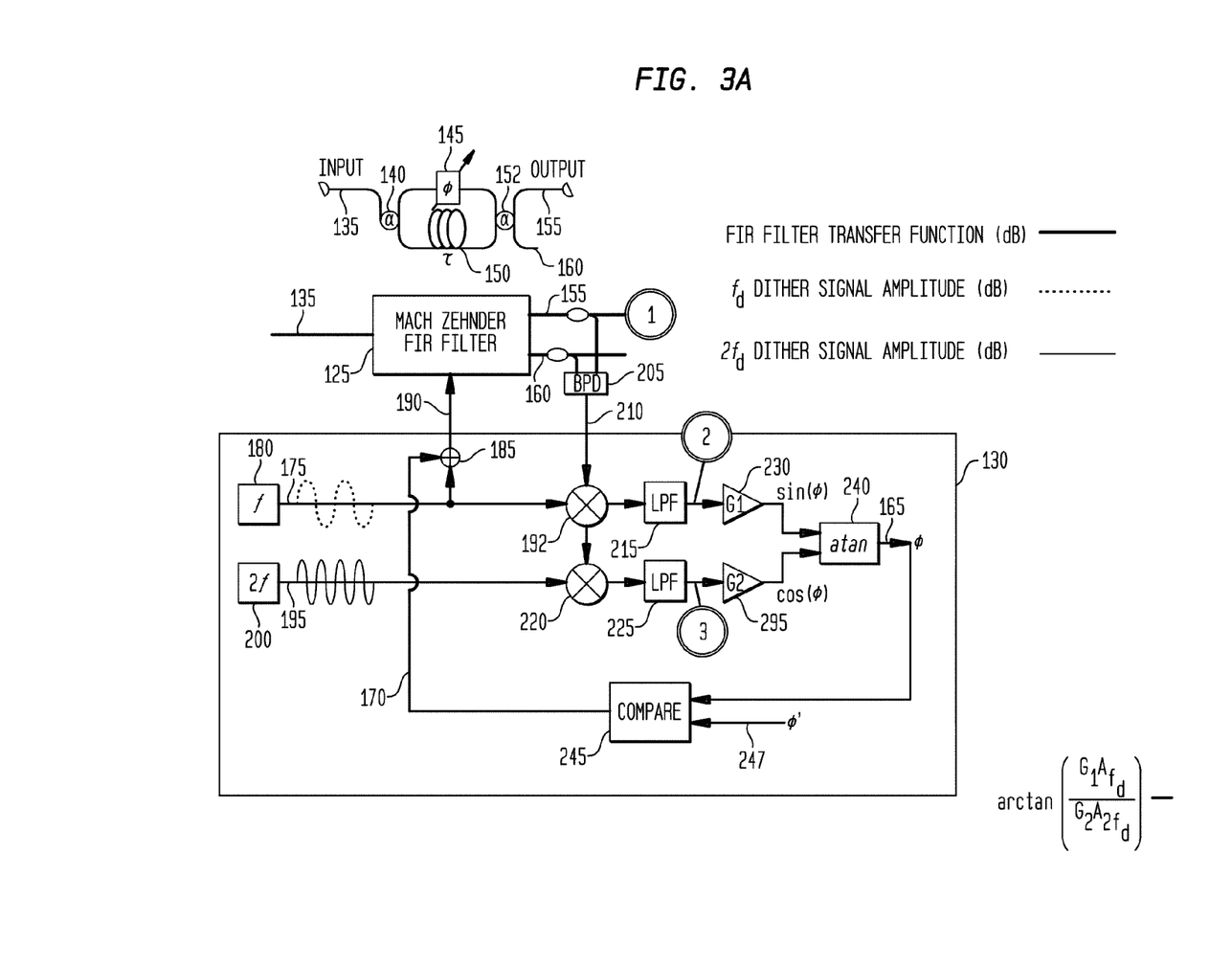
FIG. 3A is a block diagram showing a control system for measuring the position of a filter zero associated with a single unit cell and maintaining the position of the zero at a desired position.

Referring now to FIG. 3A, setting and control of a simplified unit cell 125, providing a zero response only, will be described in detail. FIG. 3A is a block diagram showing a control system 130 for measuring the position of a filter zero and maintaining the position of the zero at a desired position. For purposes of brevity of description, the unit cell under consideration in FIG. 3A is a Mach Zehnder Finite Impulse Response (FIR) Filter, which is a type of unit cell that is capable only of providing a zero. As can be seen from FIG. 3A, the unit cell includes an input 135, a first tunable coupler 140, a phase shifter 145, a delay 150, a second tunable coupler 152, a first output 155, and a second output 160. In an embodiment, each of couplers 140 and 152 take the form of a tunable directional coupler as shown in FIG. 2. For each of tunable couplers 140 and 152 one can control the relative division of the coupler's input between the coupler's two outputs. For example, the phase shifter of coupler 140 may be set to evenly divide input 135 between the tunable coupler's outputs. For the remainder of this description, it will be assumed that both of tunable couplers 140 and 152 are set to evenly divide their inputs between their outputs.

It should be noted that tunable couplers 140 and 152 each introduce a 90 degree relative phase shift to the "cross-coupled" signal compared to the "through-coupled" signal. That is, tunable coupler 140 shifts light entering input 135 and traveling the delay path by 90 degrees relative to light traveling the phase shifter path, and tunable coupler 152 shifts light traveling the delay path and exiting output 155 by 90 degrees relative to light traveling the phase shifter path.

Referring back to the unit cell 125 in general, the cell can provide a zero output, or "nulled output," for a given optical frequency through adjustment of phase shifter 145. That is, by adjusting phase shifter 145 such that the signal traveling the phase shifter path is 180 degrees out of phase with the signal traveling the delay path, when the two exit coupler 152, the two signals will cancel each other, and the resulting output 155 will be zero, or substantially zero. Further, if the phase shifter is then adjusted from this initial "zero" phase-shift setting to a new setting, the unit cell may still provide a zero, although such zero will occur at a frequency for which the new phase-shift setting results in a 180 degree difference between the signal paths. Thus, the "differential phase" between the phase shifter path and the delay path corresponds to the position of the unit cell zero. The differential phase can be controlled through adjustment of phase shifter 145, and therefore the position of the zero with respect to frequency can be controlled through control of phase shifter 145

By tracking the differential phase of the unit cell one can track the position of the unit cell zero. Also, if tracking reveals that the zero has moved from a desired position, one can return the zero to the desired position by adjusting phase shifter 145 so as to set the necessary differential phase.

Control system 130 generates a signal 165 ("φ") indicative of the differential phase (the zero position) and an offset signal 170 for maintaining the differential phase (the zero position) as desired. The offset signal serves as feedback generated on the basis of differential phase signal 165. In order to generate the differential phase signal and the offset signal, the control system generates a dither signal 175 and a reference signal 195. The dither signal has a frequency "f" and is generated by a first signal generator 180. The reference signal has a frequency "2f" and is generated by a second signal generator 200.

The dither signal is combined at a summer 185 with offset signal 170 and the output of the summer serves as a phase shift control signal 190, which determines the phase shift applied by optical phase shifter 145. The dither signal is also connected to a first mixer 192.

Mixer 192 also receives the output of an optical-electrical converter 205. The optical-electrical converter combines the signals from filter outputs 155 and 160 and converts the result to an electrical signal 210. It is electrical signal 210 that is supplied to mixer 192. Mixer 192 mixes electrical signal 210 with the dither signal 175 and outputs the result to a first low pass filter 215 and a second mixer 220. The second mixer 220 mixes the signal received from the first mixer 192 with reference signal 195 and outputs the result to a second low pass filter 225. The filtering implemented by low pass filters 215 and 225 is such that the outputs of the filters can be amplified and then used to compute a signal indicative of the differential phase via an arctangent calculation.

The outputs of the first and second low pass filters are coupled respectively to a first amplifier 230 and a second amplifier 235. The amplifier gain coefficients are calibrated such that maximum output amplitudes of the amplifiers are equal, or substantially equal. The outputs of the first and second amplifiers are coupled to a computation unit 240. The computation unit uses the output of the amplifiers in an arctangent calculation to generate the differential phase signal 165, the unit dividing the output of first amplifier by the output of the second amplifier and then computing the arctangent of the result.

The differential phase signal computed by unit 240 is coupled to a comparison unit 245. The comparison unit compares the differential phase to a desired differential phase signal 247 ("φ"—the desired zero position) and generates offset signal 170 indicative of the difference between the measured differential phase signal and the desired differential phase signal. In one embodiment the offset signal is a direct current (DC) electrical signal, and in the case of phase shifter 145 being a thermo-optic phase shifter, such DC signal can be used to directly control the amount of phase shift applied by shifter 145. Further, it should be noted that each of the differential phase signal and the desired differential phase signal may be analog signals or digital signals. The full range of suitable signal types for the differential phase and desired differential phase signals will be apparent to one skilled in the art after review of this disclosure.

In one embodiment, the control system of FIG. 3A is selectively used to generate a signal indicative of differential phase and generate the offset signal. Such system does not apply the dither signal to phase shifter 145 (through summer 185) at all times, but rather, only in a "calibration mode." At other times, in a "normal mode," only the offset signal is applied to phase shifter 145 (through summer 185).

Figure 3B:
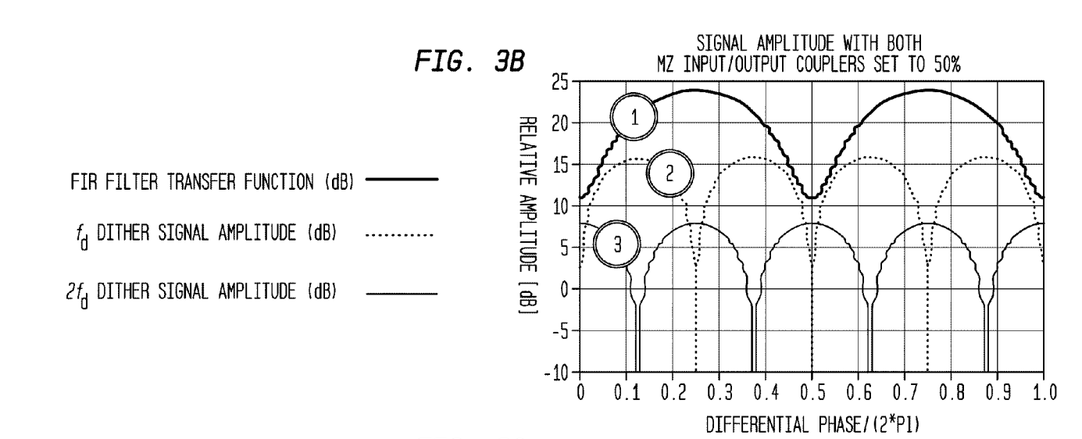
FIG. 3B is a graph showing plots of the signals denoted as signal 1, signal 2, and signal 3 in FIG. 3A.
Figure 3C:
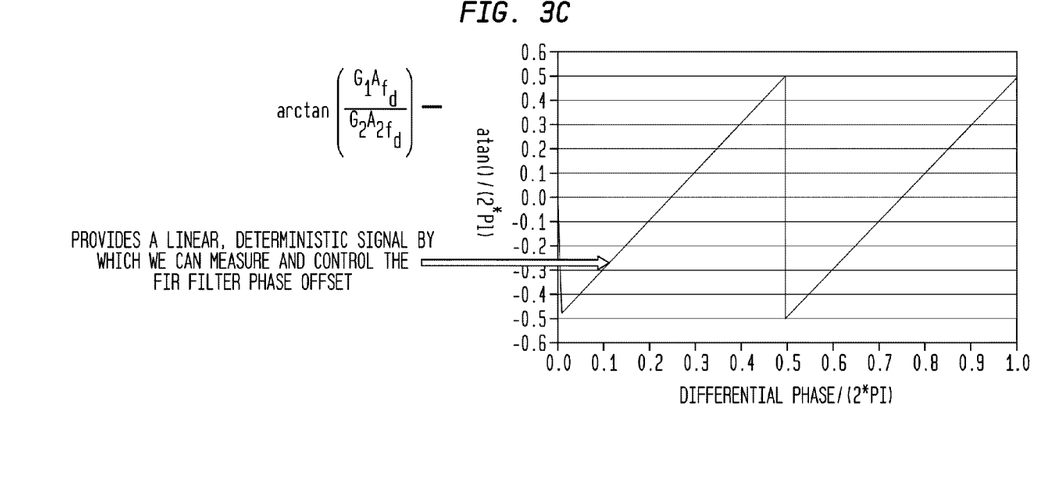
FIG. 3C is a graph showing the measured value of $\phi$ depicted in FIG. 3A.

The graphs of FIGS. 3B and 3C are instructive in describing the operation of control system 130.

FIG. 3B is a graph showing plots of the signals denoted as signal 1, signal 2, and signal 3 in FIG. 3A. The relative amplitude of the signals are plotted as a function of the differential phase. As can be seen from the graph, the signal appearing at filter output 155 is maximized at differential phase values of 90 degrees and 270 degrees. The respective outputs of the first and second low pass filters are also shown as a function of differential phase.

FIG. 3C is a graph showing the value of the arctangent calculation ("φ") performed in unit 240 as a function of differential phase. As can be seen from the figure, the arctangent as a function of differential phase serves as a deterministic signal by which the differential phase (zero position) can be determined, and thereby controlled. Thus, for example, if the desired differential phase is 120 degrees (corresponding to an arctan of about 0.33), and the measured differential phase is 144 degrees (corresponding to an arctan of about 0.40), one would apply an offset signal to phase shifter 145 sufficient for moving the arctan value from 0.40 to 0.33. The plot of FIG. 3C may be referred to as the "control response" of unit cell 125, and it may be said that the differential phase is determined by comparing signal 165 to the control response.

Figure 4:
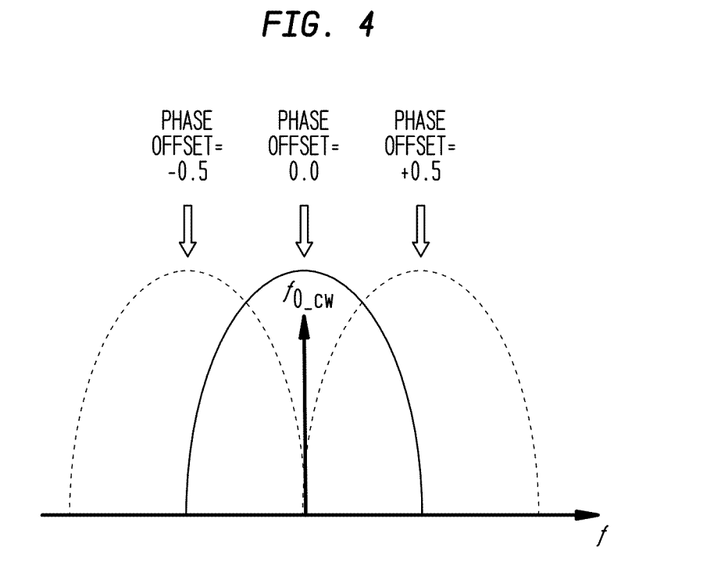
FIG. 4 is a plot showing how the frequency response of a unit cell having a single zero can be shifted through control of the phase shifter of FIG. 3A.

FIG. 4 is a plot showing how the frequency response of a unit cell having a single zero response can be shifted through control of the phase shifter of FIG. 3A. In FIG. 4, the abscissa represents frequency. When the differential phase of the unit cell is zero, the frequency response is a band-pass response centered at fo_cw. When the differential phase is set to −0.5, the response is shifted to the left, realizing a band-pass response having a zero positioned to the right of the band at fo_cw. When the differential phase is set to 0.5, the response is shifted to the right, realizing a band-pass response having a zero positioned to the left of the band at fo_cw.

Having described control of a unit cell imparting a single zero to a filter transfer function, control of a unit cell imparting a single pole to a filter transfer function will now be described.

A unit cell for imparting a single pole to a filter transfer function may be realized by modifying unit cell 75B of FIG. 2. Such a single-pole cell could be realized by removing the optical path which includes phase shifter 95A, replacing directional coupler 90A with a single path coupling input 105 to directional coupler 90B, and replacing phase shifter 95B with a single direct path. The single-pole cell may be referred to as an Infinite Impulse Response (IIR) cell.

Figure 5A:
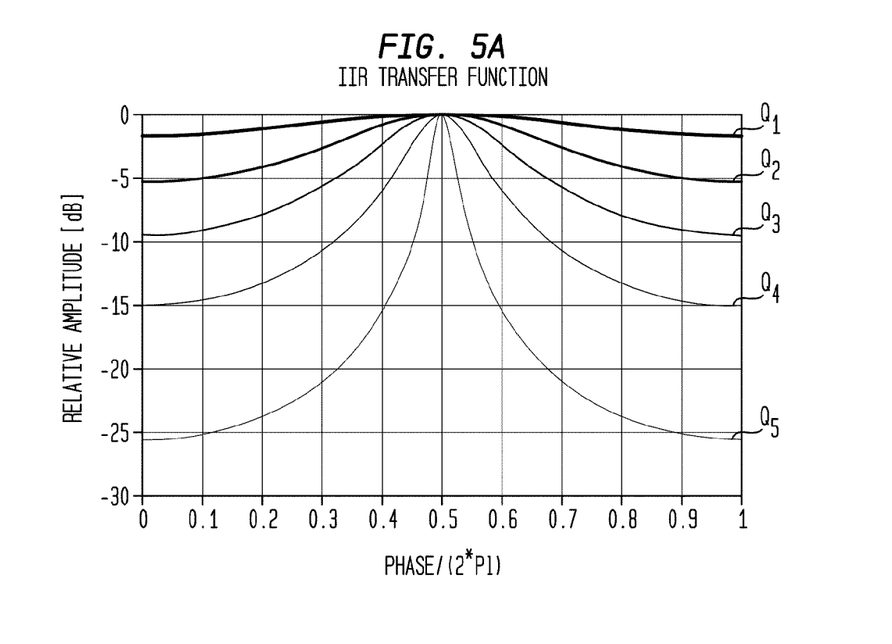
FIG. 5A is a graph showing plots of a transfer function of a single pole unit cell of an embodiment, the plots corresponding to respective Q values of the unit cell, and the pole being centered at the middle of a differential phase range.

FIG. 5A is a graph showing plots of a transfer function of a single pole unit cell of an embodiment, the plots corresponding to respective filter Q values of the unit cell, and the pole being centered at the middle of the differential phase range. The filter Q values for the plots are denoted Q1, Q2, Q3, Q4, and Q5. Q1 represents the lowest of the filter Q values, Q2 represents the next lowest of the filter Q values, and so on to Q5 which represents the highest of the filter Q values.

Figure 5B:
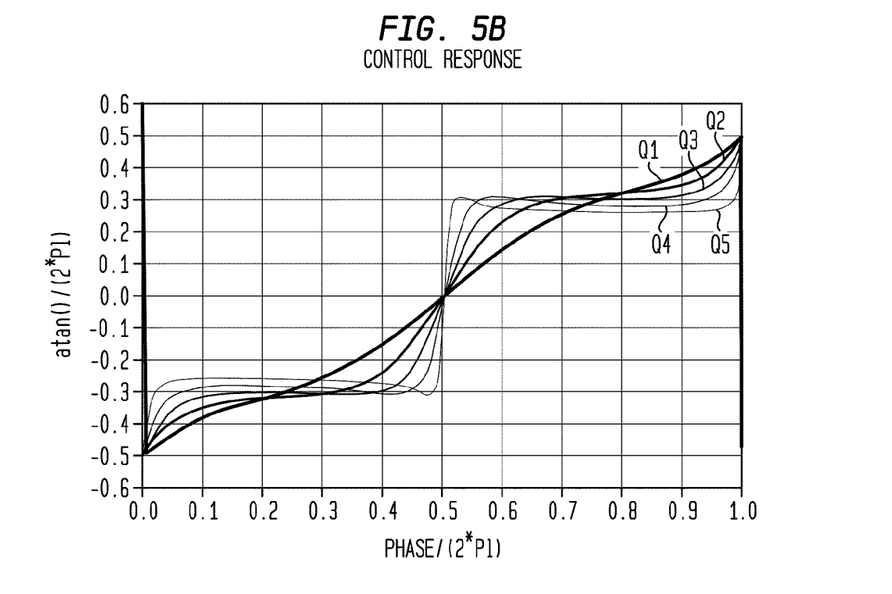
FIG. 5B is a graph showing the control response plots corresponding to respective plots in FIG. 5A, the control response corresponding to the values of $\phi$ that would be obtained in the control system of FIG. 3A if such control system were being used to control the single pole unit cell described by the graph of FIG. 5A.

FIG. 5B is a graph showing the control response plots corresponding to respective plots in FIG. 5A. In FIG. 5A, for each filter Q value the control response plot shows the values of φ (as a function of differential phase) that would be obtained by the control system of FIG. 3A, if such control system were being used to control the corresponding single pole unit cell described by the graph of FIG. 5A. As can be seen from FIG. 5B, the control response for the single-pole unit cell is relatively linear and deterministic for the low filter Q value Q1. However, the control response is relatively linear and deterministic for only a small portion (the "controllable region") of the plot for Q5, such portion being centered on a differential phase value of 180 degrees. Indeed the controllable region shrinks as Q increases.

Nevertheless, the control responses shown in FIG. 5B can be used to determine and control the position of a unit cell having a single pole response, albeit with a more limited controllable region. When operating in the controllable region, control system 130 of FIG. 3A can be applied to the single-pole unit cell, the arctangent calculation determining the differential phase in accordance with the control response, and the differential phase being compared to the desired differential phase.

Figure 6A:
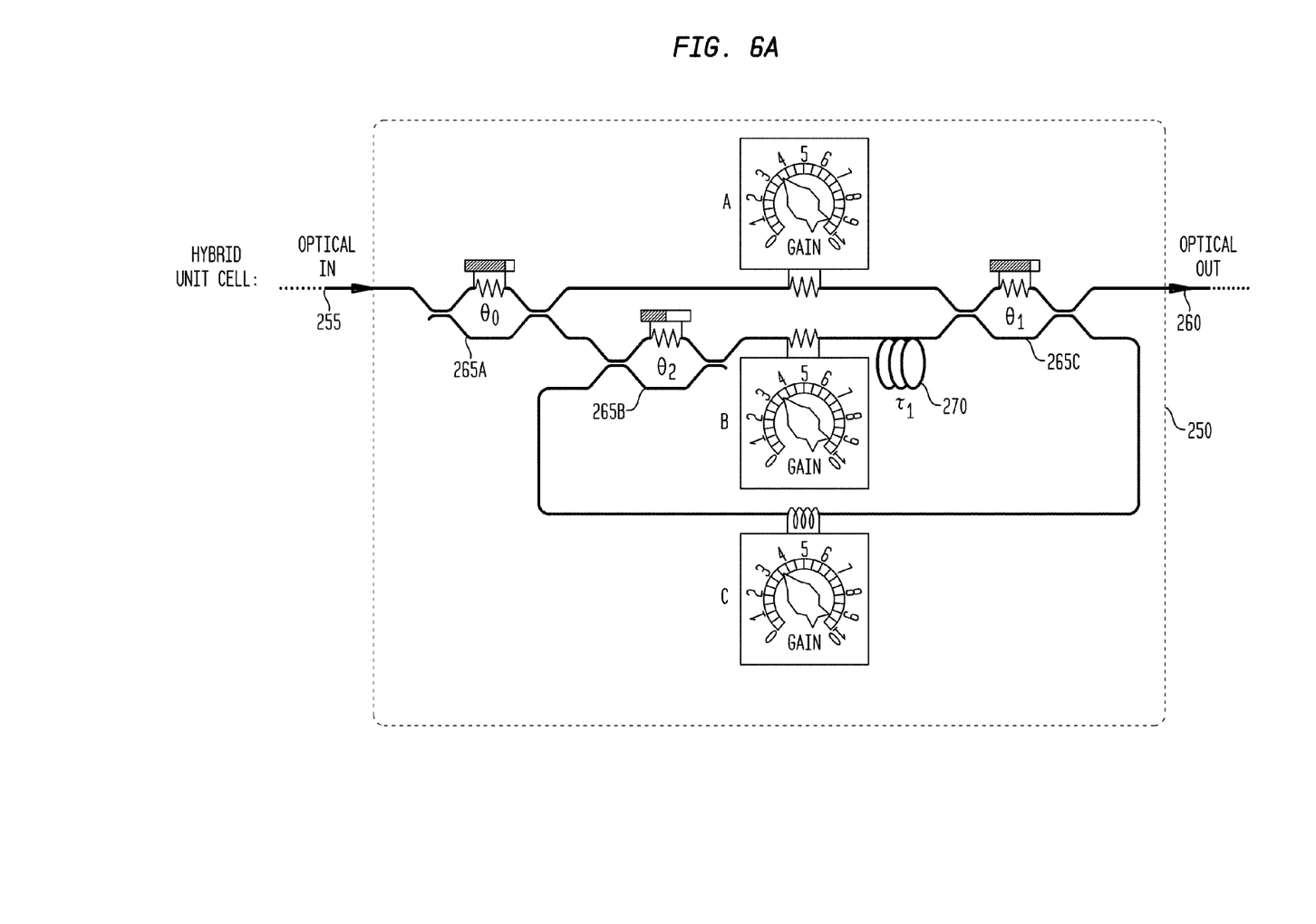
FIG. 6A is a schematic diagram of a hybrid unit cell capable of simultaneously providing a pole and zero response according to an embodiment, including phase shifters A, B, and C.

Referring now to FIG. 6A, there is shown a schematic diagram of a unit cell 250 according to an embodiment. The transfer function of unit cell 250 may include both one zero and one pole simultaneously. Accordingly, unit cell may be used to impart one zero and one pole simultaneously to an optical filter. The cell receives an optical input signal 255 and outputs an optical output signal 260. The cell includes directional couplers 265A, 265B, and 265C, optical phase shifters "A", "B", and "C", and optical delay 270. Through control of one or more of phase shifters "A", "B", and "C" control of the zero and/or pole positions of the unit cell can be realized.

Figure 6B:
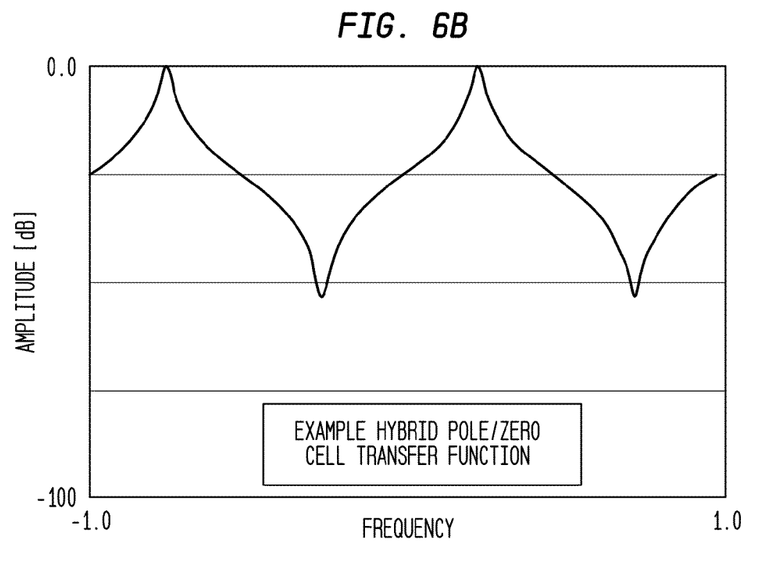
FIG. 6B is a graph is showing a plot of a frequency transfer function of a hybrid pole/zero unit cell of an embodiment.

FIG. 6B is a graph is showing a plot of an illustrative frequency transfer function of the unit cell of FIG. 6A. The graph shows both pole and zero features simultaneously. The abscissa represents frequency and the ordinate represents the amplitude of the transfer function. The amplitude peak indicates the pole and the amplitude trough indicates the zero. The repeating pattern of peaks and troughs is a result of periodic interference that occurs in the frequency domain.

Figure 6C:
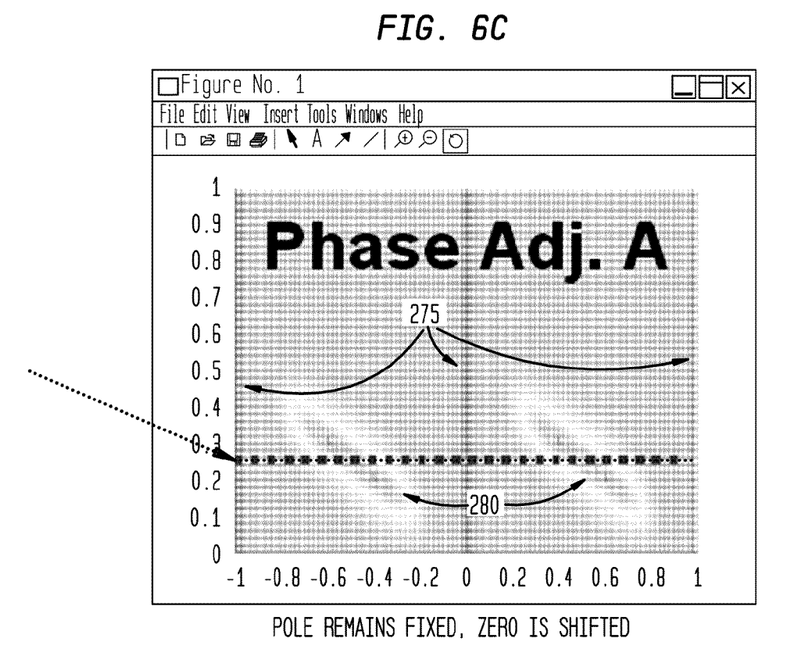
FIG. 6C is a graph showing how variation of phase shifter A affects the positions of the pole and zero of the unit cell of FIG. 6A.

FIG. 6C is a graph showing how variation of phase shifter A affects the positions of the pole and zero of the unit cell of FIG. 6A. Each horizontal line of the graph represents a unique position of phase shifter A. The position of the pole is indicated by darkened regions 275, and the position of the zero is indicated by darkened regions 280. Thus, for example, when phase shifter A is set to 0.25 (90 degrees) the position of the pole is approximately equal to the center carrier optical frequency (or "0") and the position of the zero is located at a relative optical frequency offset corresponding to a 180 degree phase offset (or "0.5") on the complex Z-plane. As can be seen from the figure, as the phase shift applied by phase shifter A is increased the pole position remains fixed and the zero position shifts to the left.

Figure 6D:
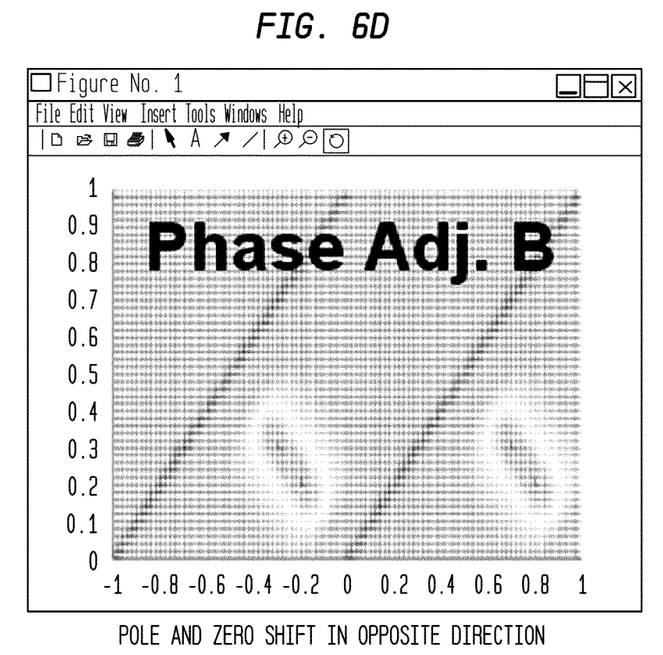
FIG. 6D is a graph showing how variation of phase shifter B affects the positions of the pole and zero of the unit cell of FIG. 6A.

FIG. 6D is a graph showing how variation of phase shifter B affects the positions of the pole and zero of the unit cell of FIG. 6A. As can be seen from the figure, as the phase shift applied by phase shifter B is increased the pole position shifts to the right and the zero position shifts to the left.

Figure 6E:
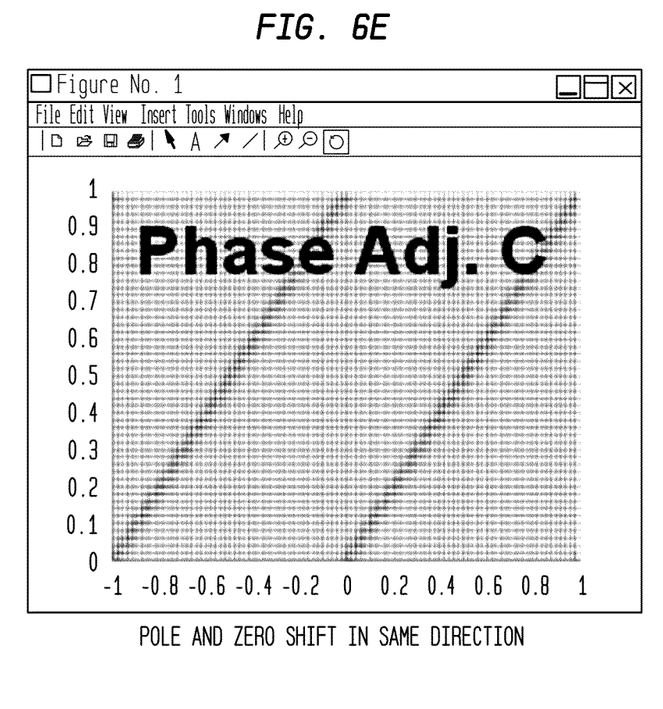
FIG. 6E is a graph showing how variation of phase shifter C affects the positions of the pole and zero of the unit cell of FIG. 6A.

FIG. 6E is a graph showing how variation of phase shifter C affects the positions of the pole and zero of the unit cell of FIG. 6A. As can be seen from the figure, as the phase shift applied by phase shifter C is increased the pole position shifts to the right and the zero position shifts to the right, tracking each other in relative frequency offset.

The position shifting properties depicted in FIG. 6E allow for a controllable unit cell that contributes both a pole and zero to an optical filter. The unit cell of FIG. 6A can be used in combination with control system 130 of FIG. 3A such that the offset signal 170 controls the position of the pole and zero. In one embodiment, the unit cell of FIG. 6A can be controlled as follows. First a dither signal is applied only to phase shifter B for purposes of positioning the pole at or near the center carrier optical frequency (or "0"), thereby positioning the pole at or near the center of the controllable region. Next, a dither signal is applied only to phase shifter A for purposes of positioning the zero at a frequency that is offset from the pole position by a predetermined amount. Finally, using only phase shifter C the pole and zero positions are moved in tandem to their desired positions. In this embodiment, once the pole and zero have been initially set to their desired positions, one can maintain the pole and zero at their desired positions by applying a dither signal only to phase shifter A and generating an indication of differential phase based on such dither signal. The indication of differential phase is then compared to an indication of desired differential phase and an offset signal is generated. The offset signal is applied only to phase shifter C, and thus both the pole and zero are maintained at the desired position because the positions of the pole and zero track each other when movement is effected through phase shifter C.

Particular embodiments of the system and method described in reference to FIGS. 1A-6E include the following.

A method for controlling an optical filter, comprising dithering a delay of an optical path within an optical filter unit cell; measuring a position of a filter zero, a position of a filter pole, or positions of both a filter zero and a filter pole by observing an output of the unit cell when the delay is dithered; and using the measurement as feedback for maintaining the position of the filter zero at a desired position, maintaining the position of the filter pole at a desired position, or maintaining the positions of both the filter zero and the filter pole at desired positions.

The method as described in paragraph [0059], wherein dithering a delay of an optical path comprises dithering an optical phase shifter associated with the optical path.

The method as claimed in paragraph [0059], wherein measuring comprises generating a differential phase signal indicative of a differential phase between the optical path within the optical filter and a second optical path within the optical filter.

The method as described in paragraph [0061], wherein using comprises generating an offset signal by comparing the differential phase signal to a desired differential phase signal indicative of a desired differential phase between the optical path within the optical filter and a second optical path within the optical filter.

The method as described in paragraph [0062], wherein the offset signal is a direct current signal.

The method as described in paragraph [0062], wherein the offset signal is a digital signal.

The method as described in paragraph [0062], wherein using further comprises adjusting a phase shifter associated with the optical path according to the offset signal.

The method as described in paragraph [0061], wherein generating a differential phase signal comprises performing an arctangent calculation.

A system for controlling an optical filter, comprising circuitry for receiving a dither signal used for dithering a delay of an optical path within an optical filter unit cell, and for measuring a position of a filter zero, a position of a filter pole, or positions of both a filter zero and a filter pole by observing an output of the unit cell when the delay is dithered; and a unit for generating feedback based on the measurement, the feedback being used for maintaining the position of the filter zero at a desired position, maintaining the position of the filter pole at a desired position, or maintaining the positions of both the filter zero and the filter pole at desired positions.

The system as described in paragraph [0067], wherein the circuitry for measuring comprises an optical-electrical converter for converting at least one output of the unit cell from an optical signal to an electrical signal; and a mixer for mixing the electrical signal output from the optical-electrical converter with the dither signal.

The system as described in paragraph [0068], further comprising a second mixer for mixing an output of the mixer with a reference signal.

The system as described in paragraph [0069], wherein the reference signal is a signal of frequency that is twice the frequency of the dither signal.

The system as described in paragraph [0069], further comprising a first low pass filter for filtering an output of the mixer; a second low pass filter for filtering an output of the second mixer; a first amplifier for amplifying an output of the first low pass filter; a second amplifier for amplifying an output of the second low pass filter; and a computation unit for generating an indication of the position of a filter zero, the position of a filter pole, or the positions of both the filter zero and the filter pole based on outputs of the first and second amplifiers.

The system as described in paragraph [0071], wherein the computation unit performs an arctangent calculation.

The system as described in paragraph [0067], wherein the circuitry for receiving generates a differential phase signal indicative of a differential phase between the optical path within the optical filter and a second optical path within the optical filter, and the unit for generating feedback comprises a comparison unit for comparing the differential phase signal to a desired differential phase signal indicative of a desired differential phase between the optical path within the optical filter and the second optical path within the optical filter.

The system as described in paragraph [0073], wherein comparison unit generates a direct current signal.

The system as described in paragraph [0073], wherein the comparison unit generates a digital signal.

The system as described in paragraph [0067], further comprising a dither signal generator for generating the dither signal.

A system for controlling an optical filter, comprising means for receiving a dither signal used for dithering a delay of an optical path within an optical filter unit cell, and for measuring a position of a filter zero, a position of a filter pole, or positions of both a filter zero and a filter pole by observing an output of the unit cell when the delay is dithered; and means for generating feedback based on the measurement, the feedback being used for maintaining the position of the filter zero at a desired position, maintaining the position of the filter pole at a desired position, or maintaining the positions of both the filter zero and the filter pole at desired positions.

The system as described in paragraph [0077], wherein the means for receiving generates a differential phase signal indicative of a differential phase between the optical path within the optical filter and a second optical path within the optical filter, and the means for generating feedback comprises means for comparing the differential phase signal to a desired differential phase signal indicative of a desired differential phase between the optical path within the optical filter and the second optical path within the optical filter.

As these and other variations and combinations of the features discussed above can be utilized without departing from the present invention as defined by the claims, the foregoing description of the one embodiments should be taken by way of illustration rather than by way of limitation of the invention as defined by the claims.

The invention claimed is:

1. A method for controlling an optical filter, comprising:
   dithering a delay of an optical path within an optical filter unit cell;
   measuring a position of a filter zero, a position of a filter pole, or positions of both a filter zero and a filter pole by observing an output of the unit cell when the delay is dithered; and
   using the measurement as feedback for maintaining the position of the filter zero at a desired position, maintaining the position of the filter pole at a desired position, or maintaining the positions of both the filter zero and the filter pole at desired positions.

2. The method as claimed in claim 1, wherein dithering a delay of an optical path comprises dithering an optical phase shifter associated with the optical path.

3. The method as claimed in claim 1, wherein measuring comprises generating a differential phase signal indicative of a differential phase between the optical path within the optical filter and a second optical path within the optical filter.

4. The method as claimed in claim 3, wherein using comprises generating an offset signal by comparing the differential phase signal to a desired differential phase signal indicative of a desired differential phase between the optical path within the optical filter and a second optical path within the optical filter.

5. The method as claimed in claim 4, wherein the offset signal is a direct current signal.

6. The method as claimed in claim 4, wherein the offset signal is a digital signal.

7. The method as claimed in claim 4, wherein using further comprises adjusting a phase shifter associated with the optical path according to the offset signal.

8. The method as claimed in claim 3, wherein generating a differential phase signal comprises performing an arctangent calculation.

9. A system for controlling an optical filter, comprising:
   circuitry for receiving a dither signal used for dithering a delay of an optical path within an optical filter unit cell, and for measuring a position of a filter zero, a position of a filter pole, or positions of both a filter zero and a filter pole by observing an output of the unit cell when the delay is dithered; and
   a unit for generating feedback based on the measurement, the feedback being used for maintaining the position of the filter zero at a desired position, maintaining the position of the filter pole at a desired position, or maintaining the positions of both the filter zero and the filter pole at desired positions.

10. The system as claimed in claim 9, wherein the circuitry for measuring comprises:
    an optical-electrical converter for converting at least one output of the unit cell from an optical signal to an electrical signal; and
    a mixer for mixing the electrical signal output from the optical-electrical converter with the dither signal.

11. The system as claimed in claim 10, further comprising a second mixer for mixing an output of the mixer with a reference signal.

12. The system as claimed in claim 11, wherein the reference signal is a signal of frequency that is twice the frequency of the dither signal.

13. The system as claimed in claim 11, further comprising:
    a first low pass filter for filtering an output of the mixer;

a second low pass filter for filtering an output of the second mixer;

a first amplifier for amplifying an output of the first low pass filter;

a second amplifier for amplifying an output of the second low pass filter; and a computation unit for generating an indication of the position of a filter zero, the position of a filter pole, or the positions of both the filter zero and the filter pole based on outputs of the first and second amplifiers.

14. The system as claimed in claim 13, wherein the computation unit performs an arctangent calculation.

15. The system as claimed in claim 9, wherein the circuitry for receiving generates a differential phase signal indicative of a differential phase between the optical path within the optical filter and a second optical path within the optical filter, and the unit for generating feedback comprises a comparison unit for comparing the differential phase signal to a desired differential phase signal indicative of a desired differential phase between the optical path within the optical filter and the second optical path within the optical filter.

16. The system as claimed in claim 15, wherein comparison unit generates a direct current signal.

17. The system as claimed in claim 15, wherein the comparison unit generates a digital signal.

18. The system as claimed in claim 9, further comprising a dither signal generator for generating the dither signal.

19. A system for controlling an optical filter, comprising:

means for receiving a dither signal used for dithering a delay of an optical path within an optical filter unit cell, and for measuring a position of a filter zero, a position of a filter pole, or positions of both a filter zero and a filter pole by observing an output of the unit cell when the delay is dithered; and means for generating feedback based on the measurement, the feedback being used for maintaining the position of the filter zero at a desired position, maintaining the position of the filter pole at a desired position, or maintaining the positions of both the filter zero and the filter pole at desired positions.

20. The system as claimed in claim 19, wherein the means for receiving generates a differential phase signal indicative of a differential phase between the optical path within the optical filter and a second optical path within the optical filter, and the means for generating feedback comprises means for comparing the differential phase signal to a desired differential phase signal indicative of a desired differential phase between the optical path within the optical filter and the second optical path within the optical filter.

* * * * *

UNITED STATES PATENT AND TRADEMARK OFFICE
CERTIFICATE OF CORRECTION

PATENT NO. : 8,497,467 B2  Page 1 of 1
APPLICATION NO. : 12/639331
DATED : July 30, 2013
INVENTOR(S) : Toliver It is certified that error appears in the above-identified patent and that said Letters Patent is hereby corrected as shown below:

In the Specification

In Column 3, Lines 19-20, delete "control system" and insert -- control subsystem --, therefor.

In Column 5, Line 6, delete "shifter 145" and insert -- shifter 145. --, therefor.

In Column 5, Line 55, delete "("ϕ"-the" and insert -- ("ϕ"-the --, therefor.

Signed and Sealed this
Twenty-eighth Day of October, 2014

Michelle K. Lee
*Deputy Director of the United States Patent and Trademark Office*